United States Patent [19]

Younger

[11] Patent Number: 5,820,507
[45] Date of Patent: Oct. 13, 1998

[54] METHOD AND SYSTEMS FOR IMPROVING THE OPERATION OF A FORD AODE TRANSMISSION

[76] Inventor: Gilbert W. Younger, 2621 Merced Ave., El Monte, Calif. 91733

[21] Appl. No.: 816,715

[22] Filed: Mar. 13, 1997

[51] Int. Cl.$^6$ .............................. F16H 15/50; F16H 61/26
[52] U.S. Cl. .......................... 475/116; 475/120; 477/156
[58] Field of Search ............................ 477/156; 475/116, 475/120; 74/606 R

[56] References Cited

U.S. PATENT DOCUMENTS

| | | | |
|---|---|---|---|
| 5,253,549 | 10/1993 | Younger | 475/146 |
| 5,540,628 | 7/1996 | Younger | 475/120 |
| 5,624,342 | 4/1997 | Younger | 475/116 |
| 5,730,685 | 3/1998 | Younger | 477/156 |

*Primary Examiner*—Khoi Q. Ta
*Attorney, Agent, or Firm*—Mark P. Stone

[57] ABSTRACT

The present invention is directed to methods and systems for improving the operation of a transmission for an automotive vehicle, and in particular the transmission as installed by the original automobile manufacturer. The methods and systems of the present invention modify the original hydraulic fluid circuits of the automotive transmission provided by the automobile manufacturer to enable the transmission to manually select any available ratio at any time, to select first gear at any time, and to enable the transmission to produce quick applies during upshifts and fast releases during downshifts for improved performance and heavy duty use with only minimum ratio sharing or overlap during gear changes. The modification of the original automotive transmission to achieve these goals includes adjustment of the hydraulic fluid circuits by providing a new 1–2 shift valve, by providing a new manual valve, by providing a new 3–4 shift valve, by providing new hydraulic flow circuits, by discontinuing use of existing hydraulic circuits, by enlarging the size of pre-existing orifices and by plugging other orifices, and by adjusting pre-existing spring and pressure values; all of which adjust the fluid flow and operation of the original factory installed automotive transmission in accordance with the basic objectives of the present invention.

20 Claims, 4 Drawing Sheets

METHOD AND SYSTEMS FOR IMPROVING THE OPERATION OF A FORD AODE TRANSMISSION

BACKGROUND OF THE INVENTION

The methods and systems of the present invention are directed to the modification and improvement of transmissions for automotive vehicles of the type installed by the original equipment manufacturers. The invention is particularly directed to the improvement and modification of the automotive transmission commonly designated as "AODE" which is "factory installed" in automotive vehicles manufactured by Ford Motor Company of Dearborn, Mich.

The present inventor owns U.S. Pat. No. 5,253,549, issued Oct. 19, 1993 and entitled "Methods And Systems For Improving The Operation Of Automatic Transmissions For Vehicles"; U.S. Pat. No. 4,790,938, issued on Dec. 13, 1988 and entitled "Filter For Removing Particulate Matter From Fluid Within A Movable Body"; U.S. Pat. No. 4,711,140, issued Dec. 8, 1987 and entitled "Throttle Valve System For Automatic Transmission"; U.S. Pat. No. 4,449,426, issued on May 22, 1984 and entitled "Laminated Separator Plate Means For Recalibrating Automatic Transmission"; U.S. patent application Ser. No. 08/333,552, filed Nov. 2, 1994 (now U.S. Pat. No. 5,540,628, issued Jul. 30, 1996) and entitled "Methods And Systems For Improving The Operation Of Transmissions For Motor Vehicles"; U.S. patent application Ser. No. 08/494,844, filed Jun. 26, 1995 (now U.S. Pat. No. 5,624,342, issued Apr. 29, 1997) and entitled "Methods And Systems For Improving The Operation Of Transmissions For Motor Vehicles" now U.S. Pat. No. 5,624,342; U.S. patent application Ser. No. 08/515,098, filed Aug. 14, 1995 (now U.S. Pat. No. 5,730,685, issued Mar. 24, 1998) and entitled "Methods And Systems For Improving The Operation Of Transmissions For Motor Vehicles" now U.S. Pat. No. 5,730,685; and U.S. patent application Ser. No. 08/595,810, filed Feb. 2, 1996 (now U.S. Pat. No. 5,743,823, issued Apr. 28, 1998) and entitled "Methods And Systems For Improving The Operation Of Transmissions For Motor Vehicles". The basic operation of transmissions for automotive vehicles is discussed in the aforementioned patents and patent applications, and these patents and patent applications are expressly incorporated by reference into the disclosure of the present patent application.

The basic principles of operation of the factory installed FORD AODE transmission for automotive vehicles, including the specific modes of operation thereof and the hydraulic circuits and interrelationship of hydraulic circuits, are well known to those skilled in the automotive transmission art. Attention is respectfully invited to the operations manual and text entitled 1992 *AODE TRANSMISSION HYDRAULIC OPERATION,* published by Ford Motor Company, said publication describing in detail the operation of the "factory installed" AODE transmission including a discussion of the physical components, the hydraulic circuits, and the interrelationship between the structural components, the hydraulic circuitry and resulting fluid flow patterns during normal operation of the "factory installed" transmission in automotive vehicles. The disclosure of the aforementioned publication in its entirety is expressly incorporated by reference into the disclosure of the present patent application as disclosing and illustrating background material known to those of ordinary skill in the automotive transmission art.

Two publications entitled *"AODE-HD2 Reprogramming Kit™"* and *"AODE—Stick Shift Kit®",* published by Transgo, Inc. of El Monte, Calif., are instruction sheets describing the manner in which an automotive transmission mechanic implements the modifications to the FORD AODE factory installed transmission to achieve the goals of the present invention. The disclosures of the aforementioned instruction sheets are expressly incorporated by reference into the disclosure of the present patent application.

In the original design of the AODE "factory installed" transmission, the first gear ratio cannot be obtained above a vehicle speed of approximately 34 miles per hour. A primary object of the present invention is to enable the driver of a vehicle having an AODE transmission to select first gear at any time, thereby enabling the driver to obtain a first gear ratio whenever the gear selector lever is placed in the "1" position without regard to the actual speed of the vehicle or rotational speed of the engine. This objective is accomplished by modification of the structure and operation of the existing hydraulic circuits of the original transmission (including the 1–2 shift valve) and the addition of new hydraulic circuits to the original transmission.

Further objects of the present invention include providing a modified manual valve replacing the original manual valve to reduce the rate of apply of the OD band during a manual "1–2" upshift to prevent overheating of the OD band; and providing a modified 3–4 shift valve for controlling fluid pressure applied to an OD servo regulator.

It is also desirable to modify the "factory installed" automotive transmission to result in quick application during upshifts and quick release forces during downshifts with minimum ratio sharing (overlap) during gear changes, for improved performance particularly when the vehicle is in heavy duty use. This object is obtained by varying the structure and operation of the hydraulic circuits of the original transmission to enlarge or reduce existing orifices to control the apply and release fluid flow through the hydraulic circuits, in conjunction with the modification of different spring and pressure values of the pre-existing hydraulic circuits of the factory installed transmission.

A further object of the present invention is to modify a "factory installed" AODE transmission, when designed for stick shift manual operation, to enable section of any gear ratio at any time, both with and without electronic controls. A pressure regulator valve is added to the EPC (electronic pressure control) circuit, and an EPC solenoid is replaced with a vacuum modulator.

Other objects, improvements and advantages of the present invention will become apparent to those skilled in the art from the following description in conjunction with the drawings.

SUMMARY OF THE INVENTION

Methods, apparatus and systems are provided for modifying the structure, operation, and functional relationship between structure in "factory installed" transmissions for automotive vehicles. In accordance with the present invention, an automotive transmission, and in particular the transmission identified by the designation "AODE" and installed in automotive vehicles produced by The Ford Motor Company, is modified to enable the driver to select any available gear ratio at any time, and to enable the driver to obtain a first gear ratio whenever the gear selector is placed in the first gear position without regard to actual vehicle speed. In the original "factory installed" transmission, the first gear ratio cannot be obtained for vehicle speeds exceeding approximately 34 miles per hour. The original transmission is modified by removing an existing 1–2 shift valve from the original hydraulic circuitry, and replacing it with a new 1–2 shift valve providing a fluid flow path through the valve itself to increase fluid pressure applied to one side of the new valve to permit the transmission to obtain first gear ratio when the gear selector is in a first gear position, without regard to actual vehicle speed or rotational speed of the engine. The fluid flowing through the path in the 1–2 shift valve, when the gear selector is in a first gear position, flows through the valve and into a first solenoid switch coupled in fluid flow relationship to one end of the 1–2 shift valve. This fluid flow into the solenoid supplements the flow of other fluid into the solenoid, resulting in a total quantity of fluid flowing into the solenoid which exceeds the solenoid exhaust capacity. This results in a fluid pressure being applied to one end of the 1–2 shift valve sufficient to overcome a resilient force applied to the opposed end of the 1–2 shift valve, thereby maintaining the valve in its downshifted position when the gear selector is in its first gear position. When the gear selector is moved into a second gear position, the fluid which was flowing through the 1–2 shift valve is diverted and exhausted through the manual valve, thereby reducing the pressure applied to the one end of the valve and permitting the valve to upshift as a result of the resilient force applied to the opposed end of the valve.

The modification to the automotive transmission also includes the addition of a new 3–4 shift valve to adjust the fluid pressure applied to the OD servo regulator in the factory installed transmission, and to further provide orifices and plugs in hydraulic circuitry coupling the 3–4 shift valve to the OD servo regulator valve to prevent application of line pressure to one end of the OD servo regulator unless the 3–4 shift valve is in its upshifted position. The 3–4 shift valve is modified so that fluid flow through a line connecting this valve with an OD servo regulator valve is prevented when the gear selector is in its first, second or third gear selection position (and the 3–4 shift valve is in its downshifted position), and fluid is permitted to flow through the line to apply a fluid pressure to one end of the OD servo regulator valve only when the 3–4 shift valve is moved into its upshifted position. An orifice provided in the line connecting the 3–4 shift valve and the OD servo regulator valve exhausts any fluid in this line when the gear selector is in the first, second or third gear selection position, but the orifice is sufficiently small in size to prevent exhausting of any substantial volume of fluid flowing through the line when the 3–4 shift valve is in its upshifted position.

The present invention also modifies the aforementioned "factory installed" automotive transmission by producing quick "applies" and "releases" with minimum ratio sharing (overlap), which is advantageous in improving performance when the vehicle is used for heavy duty applications. These further modifications to the operation of the original transmissions are achieved by enlarging or reducing (or plugging) orifices in the original hydraulic circuitry to modify the rate of fluid flow therethrough for controlling the apply and release fluid flow. Adjustments also are made to spring and fluid pressure characteristics of the original transmission hydraulic circuitry. When the transmission is being operated in a manual (stick shift) mode without any computer controls, the manual valve and the hydraulic circuitry are modified to provide fluid flow bypassing a 2–3 shift valve to supply fluid directly into a third clutch circuit when the gear selector is moved into the OD (overdrive) position, and to exhaust fluid through the third clutch circuit during a 3–2 manual downshift.

Further modifications to the "factory installed" transmission include the replacement of the original manual valve with a modified manual valve defining an opening therein for reducing the apply rate of the OD band during a "1–2" upshift to prevent overheating of the OD band; the addition of a pressure relief valve to the EPC (electronic pressure control) hydraulic circuitry; and modification of the EPC hydraulic circuitry to replace an EPC solenoid with a vacuum modulator.

Accordingly, the object of the present invention is to modify the operation of existing "factory installed" automotive transmissions, and in particular the FORD AODE transmission, to result in changes to the hydraulic circuitry and fluid flow therethrough to enable the driver of the vehicle to select any available ratio at any time in a stick shift manual operating mode without electronic controls, to select first gear ratio without regard to vehicle speed, and to produce quick "applies and releases" which are particularly advantageous for heavy duty applications. Other advantages and improvements of the methods, systems and apparatus of the present invention will become apparent to those skilled in the automotive transmission art from the following discussion in conjunction with the enclosed drawings.

DESCRIPTION OF THE BEST MODES FOR CARRYING OUT THE INVENTION

Figure 1A:
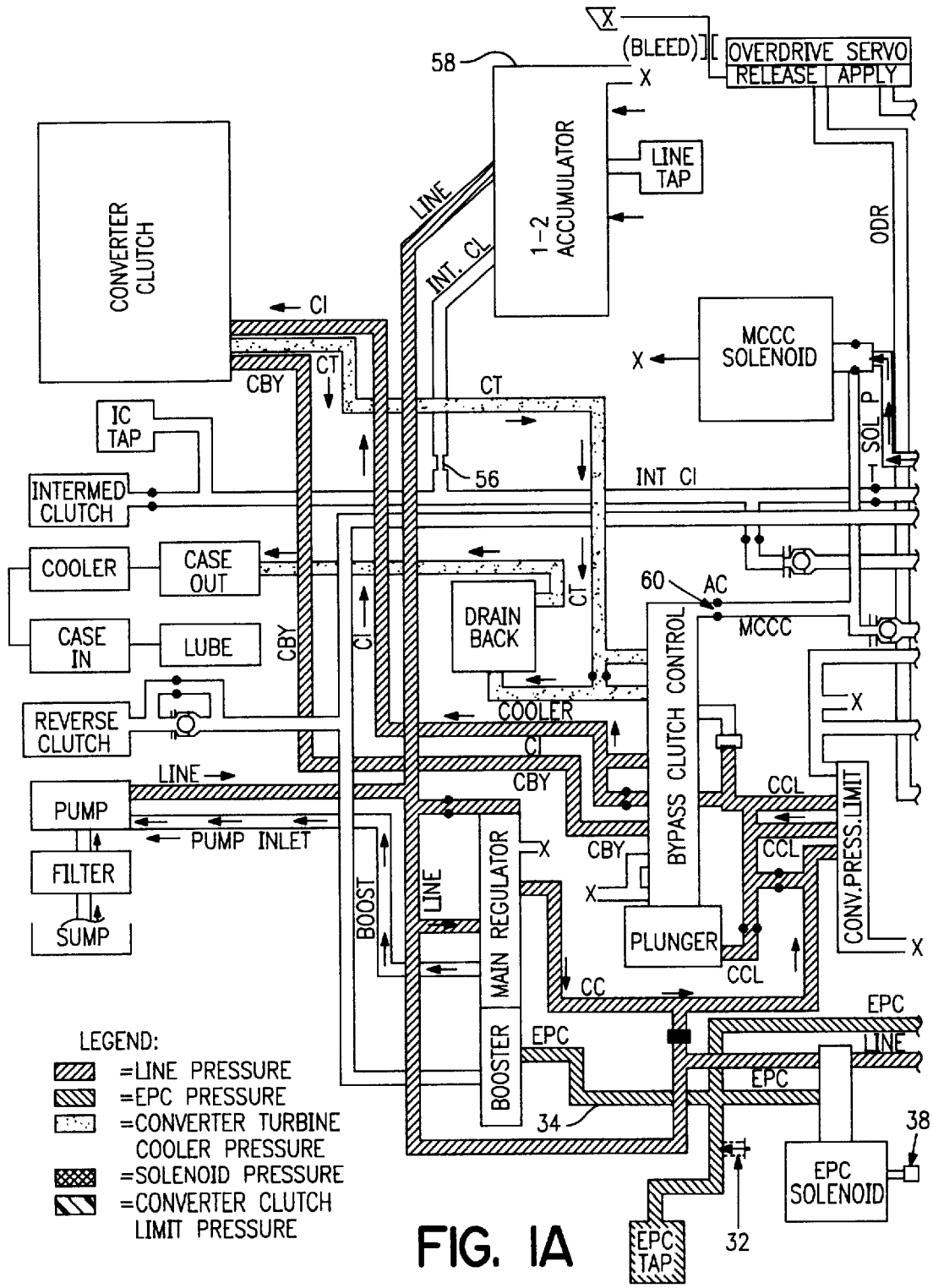
FIGS. 1A–1B illustrates the hydraulic circuitry of the FORD AODE automotive transmission in First Gear position as modified in accordance with the present invention.

The present invention is directed to improvements and modifications to existing "factory installed" automotive transmissions, and in particular the transmission designated as the FORD AODE. The objects of the present invention include modification of the structure, hydraulic circuitry, interrelationship of structure and fluid flow patterns through the hydraulic circuitry of the original factory installed transmission for the purpose of 1). enabling the driver to select first gear ratio without regard to vehicle speed, 2). enabling the driver of the vehicle to select any available ratio at any time with or without electronic controls in stick shift manual operation, and 3). to control the fluid flow through the hydraulic circuitry in order to produce quick apply forces during upshifts and quick releases during downshifts with minimum ratio sharing (overlap) during gear changes. The modifications to the original operation and hydraulic circuitry of the "factory installed" automotive transmissions are made by removing structure including original valves, adding structure including new valves, adding new hydraulic circuits to the overall circuitry, discontinuing use of existing circuits by plugging; and modifying the flow through existing hydraulic circuitry by enlarging or reducing the size of fluid flow orifices and adjusting existing spring and pressure values.

The disclosure of the Applicant's prior U.S. Pat. Nos. 5,743,823; 5,730,685; 5,624,342; 5,540,628; 5,253,549; 4,790,938; 4,711,140; and 4,449,426 are expressly incorporated by reference into the disclosure of the present patent application. Additionally, the disclosure of the aforementioned FORD operating manual entitled 1992 *AODE Transmission Hydraulic Operation,* which discloses in detail the structure and operation of the "factory installed" FORD AODE automotive transmission, is expressly incorporated by reference into the disclosure of the present patent application as describing and illustrating basic operating principles and the hydraulic circuitry of the known "factory installed" AODE automotive transmission which constitutes background information to the improvements of the present invention. The structure and operation of the "factory installed" FORD AODE transmission, including the hydraulic circuity thereof, is known to those skilled in the relevant art. The aforementioned TRANSGO instruction sheets entitled *"AODE-HD2 Reprogramming Kit"* and *AODE— Stick Shift Kit"*, which are expressly incorporated by reference into this specification, describe the manner in which the known AODE "factory installed" automotive transmission is modified by an automotive mechanic in accordance with the present invention.

The prior art operation of the "factory installed" FORD AODE automotive transmission will be briefly described as follows. Attention is directed to the 1992 *AODE Transmission Hydraulic Operation* publication for a more detailed description of the operation of the "factory installed" AODE transmission.

The "factory installed" FORD AODE transmission uses two different valve bodies. One of the valve bodies has OD, D and 1 gear selector positions, and the other valve body has OD, 2 and 1 gear selector positions. The first valve body (which does not include a "2" gear selection position), holds first gear in low. When the gear selector is in the D position, "1–2" and "2–3" automatic upshifts are permitted. In order to hold a second gear position, the operator must move the gear selector lever from the "1" to the "D" position to result in a 1–2 shift, and thereafter move the gear selector lever back into the low position at the start of the "1–2" upshift. The first valve body (which does not include the "2" gear selector position) is not the appropriate valve body to use for operation of the vehicle in a second gear ratio. Accordingly, the improvements to the AODE transmission in accordance with the present invention to be discussed below, are directed to the second valve body of the factory installed AODE transmission which includes a "2" gear selector position.

In the factory installed design of the hydraulic circuity for the AODE transmission, the vehicle speed must be approximately 34 miles per hour or below to obtain first gear ratio. When the vehicle is operating above the speed of approximately 34 miles per hour, the factory installed transmission will operate in a gear position above first. In accordance with a primary object of the present invention, the factory installed AODE transmission is modified to permit the operator to select first gear ratio, without regard to vehicle speed (i.e., engine rotational speed), whenever the gear selector is in the "1" (first) gear position.

Figure 1B:
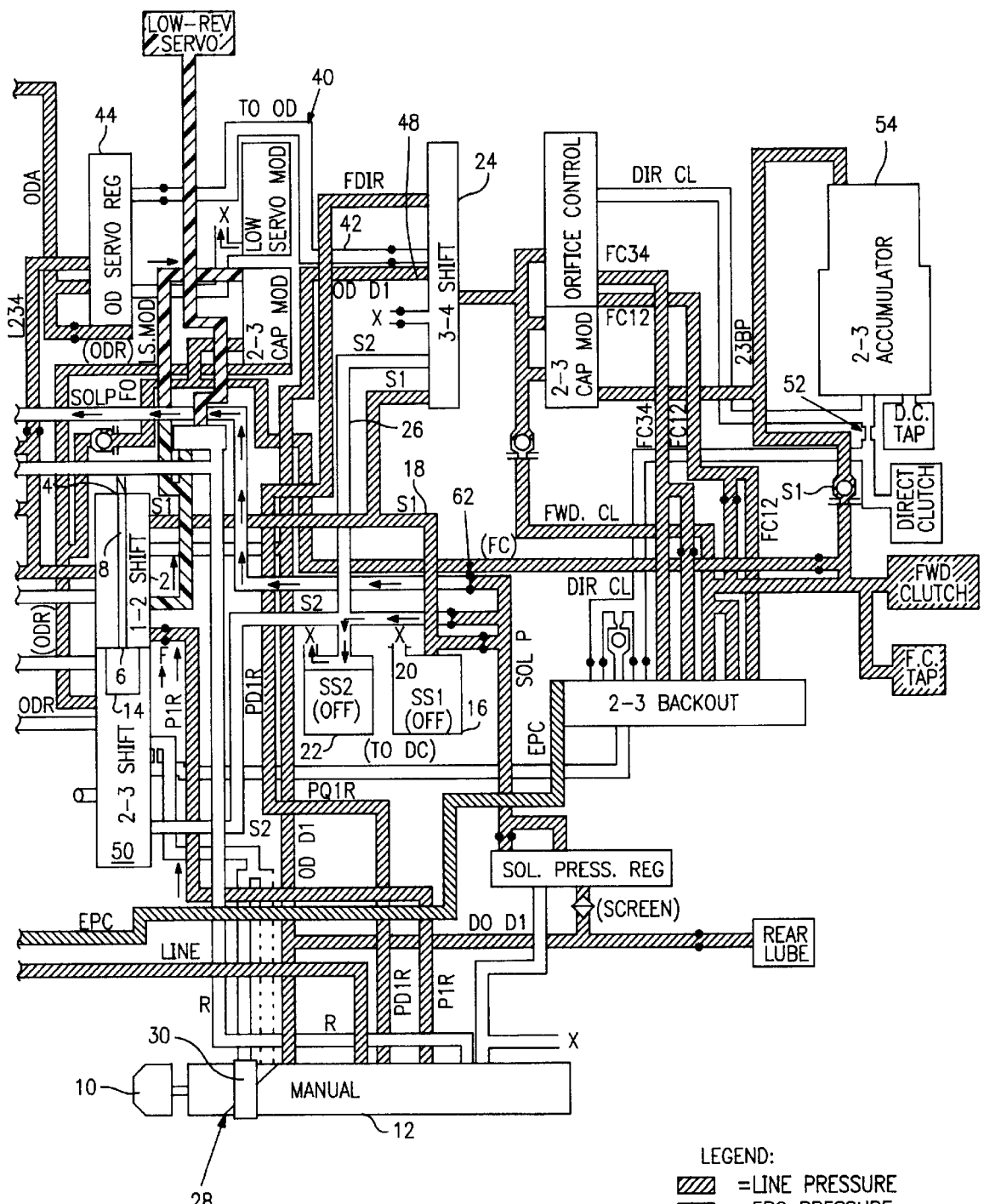
Figure 2A:
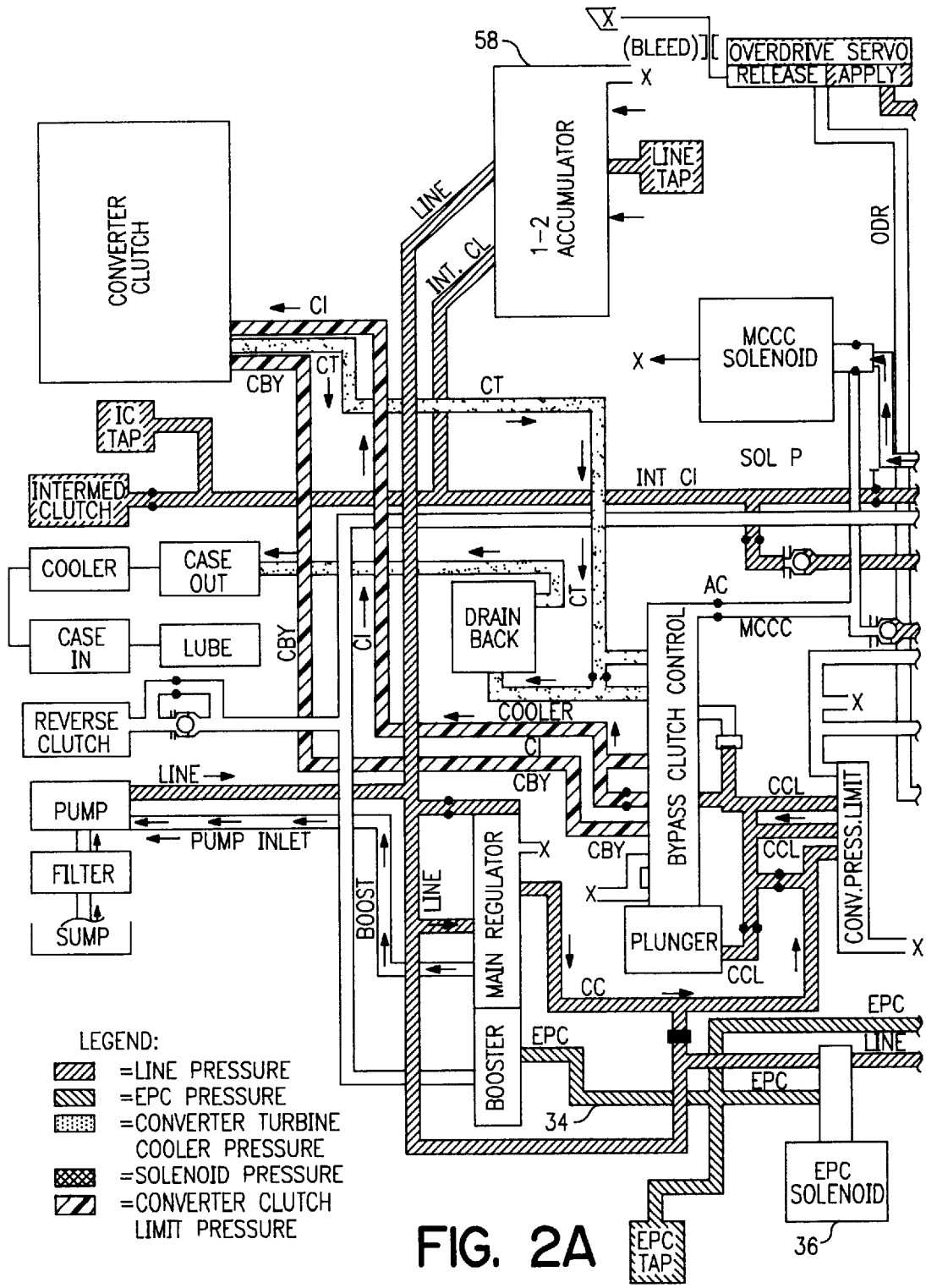
FIGS. 2A–2B illustrates the hydraulic circuitry of the FORD AODE automotive transmission in Second Gear position as modified in accordance with the present invention.
Figure 2B:
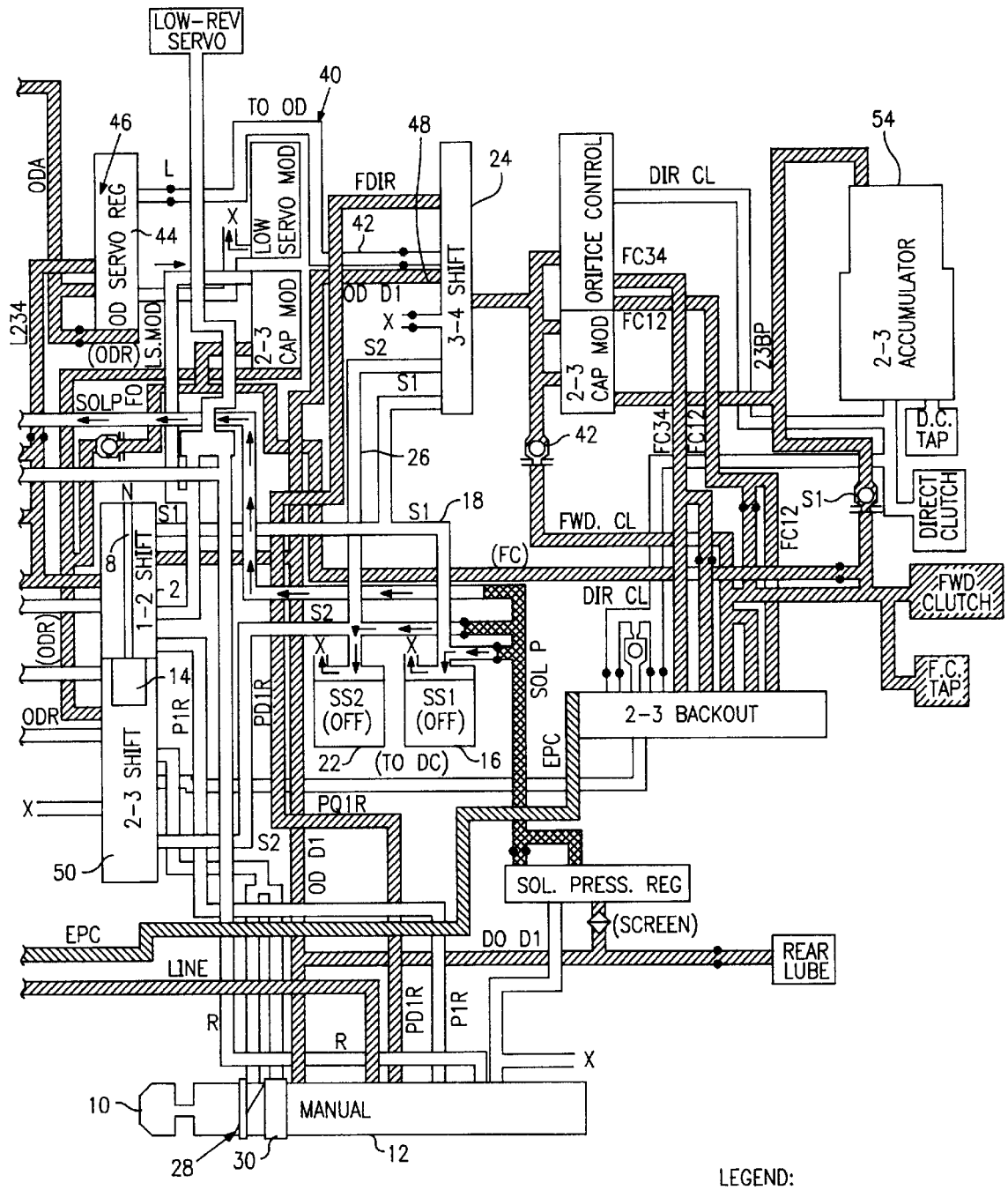

Referring to FIGS. 1 and 2 (designated as FIGS. 1A–1B and 2A–2B, respectively) the factory installed AODE transmission is modified to achieve this objective by replacing the original 1–2 shift valve with a new 1–2 shift valve designated by reference numeral 2. The upshifted position (second gear) of the valve 2 is designated by reference numeral 4, and the downshifted (first gear) position of the valve 2 is designated by reference numeral 6. As illustrated by FIG. 1, valve 2 is in its upshifted position and is being maintained in its position by the resilient force of spring 14 acting on the lower end of the valve. A passageway designated by reference numeral 8 is defined in the central portion of valve 2 and extends longitudinally therethrough. When a gear selector 10 (and thus a manual valve 12 movable with the gear selector) is moved into a first gear position, low oil is fed into the passageway 8 defined in the valve 2. The low oil flows through the passageway 8 and discharged therefrom and into a passageway 18 (an S1 solenoid oil circuit) which is coupled to the upper end of the passageway 8 defined in the valve 2. The passageway 18 provides fluid communication between passageway 8 and a first solenoid switch (SS1) which is designated by reference numeral 16. An orifice 20 is operatively associated with the solenoid switch 1 which is in an "on" position. In the "on" position, the oil received in solenoid switch 16 from passageway 18 is vented through the opened orifice 20. However, when valve 2 is in its downshifted first gear position and low oil flows therethrough, the flow of low oil supplements the flow of solenoid oil from the valve 2 into solenoid switch 16 through passageway 18 and the flow of solenoid oil into the solenoid switch 16 from a 3–4 shift valve 24 coupled to passageway 18. The volume and flow rate of both the combined low oil and solenoid oil from the valve 2 into solenoid switch 16 is sufficiently great such that the total volume of oil cannot be vented or exhausted through the opened orifice 20, thereby resulting in an oil pressure applied at the upshifted end 4 of the valve 2. The flow rate and volume of low oil through passageway 8 of the valve 2, and the size of the opened orifice 20 of solenoid switch 16, are selected such that the fluid pressure maintained at end 4 of the valve 2 is sufficient to overcome the opposed resilient force of the spring 14 acting on the valve at the downshifted end 6 thereof urging the valve in an upshifted direction. Accordingly, the downwardly directed fluid pressure applied to the valve at end 4 overcomes the opposed resilient force of the spring applied to the valve at the end 6, thereby maintaining the valve in its downshifted first gear position as long as the gear selector is in the first position (and thus low oil is flowing through the passageway 8 of the valve 2), without regard to actual vehicle speed or engine rotational speed. A check ball is provided at the upshifted end 4 of valve 2 to prevent solenoid oil from exhausting to atmophere when the gear selector is not in the first gear position, and a spring is provided to retain the check ball on the valve 2.

When the gear selector lever 10 is moved into the second gear position, as shown in FIG. 2, low oil (manual low/first oil) is exhausted at the manual valve 12. Accordingly, low oil is not fed into the passageway 8 of the 1–2 shift valve 2, and thus low oil does not flow into the solenoid switch 16. The solenoid switch 16 exhausts the solenoid oil flowing therein from the upshifted end 4 of the valve 2 through passageway 18. The solenoid switch and the orifice 20 associated therewith are capable of exhausting the solenoid oil alone (e.g., when the solenoid oil is not supplemented with the low oil), thereby reducing the fluid pressure applied to the upshifted end 4 of the valve 2. The resilient force of spring 14 acting on the downshifted end 6 of the valve 2 is not opposed by sufficient fluid pressure to overcome the spring, and the spring causes the valve 2 to upshift into its second gear position as illustrated in FIG. 1. When the 1–2 shift valve is in its upshifted second gear position, both the first solenoid switch 16 and a second solenoid switch 22 coupled to the 3–4 shift valve 24 by a passageway 26, are in an "off" position, as shown in FIG. 2. A solenoid switch in its "off" position exhausts all fluid applied thereto. As illustrated in FIG. 1, when the 1–2 shift valve 2 is in its downshifted first gear position, solenoid switch 16 is "on" (i.e., it cannot exhaust all of the fluid being supplied thereto), and solenoid switch 22 is in its "off" position in which all solenoid oil supplied thereto from the 3–4 shift valve 24 through passageway 26 is exhausted through the solenoid switch 22.

When a factory installed AODE transmission is manually shifted from the first gear position to the second gear position, the overdrive (OD) band tends to overheat as a result of contact between the band and a rotating OD drum before the intermediate clutch is able to stop rotation of the OD drum. To prevent overheating of the OD band under these conditions, the factory installed manual valve is replaced with the new manual valve designated by reference numeral 12 in FIGS. 1 and 2 of the drawing. The new manual valve 12, which like the original factory installed manual valve is movable together with the gear selector 10, has a small opening (approximately 0.040 inches in diameter) cross-drilled through it as shown by the slanted line designated by reference numeral 28. The rate of apply of the OD band during a manual 1–2 shift is decreased as a result of the opening 28 drilled in the manual valve which decreases the exhaust of overdrive servo release oil. The decreased rate of exhaust at the manual valve decreases the rate of apply of the overdrive (OD) band during a manual 1–2 shift, but has not effect on the apply rate of the overdrive (OD) band during a 3–4 gear shift. Preferably, opening 28 is drilled in the manual valve 12 through an extra land 30 on the new manual valve which is not present on the factory installed manual valve.

A characteristic of the factory installed AODE transmission is extreme line pressure. In accordance with a further aspect of the present invention, excessive line pressure of the factory installed transmission is reduced by adding a pressure relief valve designated by reference numeral 32 in FIG. 1 of the drawing to the EPC (Electronic Pressure Control) hydraulic circuit generally designated by reference numeral 34 in the drawings. The addition of the EPC pressure relief valve 32 coupled to the EPC hydraulic circuit 34, as illustrated in FIG. 1, prevents EPC oil pressure in the circuit from exceeding approximately 90 pounds per square inch (psi).

The factory installed AODE transmission is modified for stick shift (manual) operation without computer controls by replacing the EPC solenoid 36, illustrated in FIG. 2 of the drawing, with a vacuum modulator, designated by reference numeral 38 in FIG. 1 of the drawing, and coupled to the EPC line 34. Additionally, a new 3–4 shift valve, designated by reference numeral 24, replaces the factory installed 3–4 shift valve. An orificed cup plug designated by reference numeral 40 is installed in a passageway designated by reference numeral 42. The passageway 42 provides fluid communication between the 3–4 shift valve 24 and an OD servo regulator designated by reference numeral 44.

The modifications to the factory installed AODE transmission in stick shift (manual) operation (without computer controls) have been made to prevent the overdrive (OD) band from overheating or burning out during a manual 1–2 shift because the gear selector lever is constantly being moved when the transmission is in stick shift (manual) operation. The modifications to the hydraulic circuitry result in limiting the maximum pressure of the OD servo apply oil to 38 psi when the gear selector level is in manual second. The adjustment to limit the fluid pressure applied to the OD servo regulator includes the installation of an adjustment spring acting on one end of the OD servo regulator, designated by reference numeral 46 in FIG. 2, and the orificed cup plug 40 installed in line 42 between the valve 24 and the OD servo regulator 44. The spring and the orificed plug cooperate to deny line pressure from acting on the top end of OD servo regulator valve 44, as shown in the drawings. The new 3–4 shift valve 24 is provided with a wider land than on the factory installed 3–4 shift valve which it has replaced. This wider land prevents fluid flow from the valve 24 through line 42 to the OD servo regulator valve 44 when the gear selector is in the 1, 2 or 3 gear selection position. By preventing fluid from flowing through line 42 to the top end of the valve 44, the pressure on the valve 44 is controlled exclusively by the spring 46 which is selected to apply a force to the valve 44 which does not exceed about 38 psi. When the gear selector lever is moved into the 2 position during stick shift (manual) operation, the 38 psi pressure applied to the valve 44 is not sufficient to apply the OD band until the intermediate clutch stops the OD drum from rotating, yet the 38 psi pressure is sufficient to hold the drum from rotating during lift throttle coasting to furnish engine braking.

The orificed cup plug 40 installed in line 42 defines a small exhaust opening of approximately 0.020 inches in diameter. Any oil in line 42 which may be present during stick shift (manual) operation of the transmission in the 1, 2 or 3 gear selector position is exhausted from line 42 through the exhaust opening, and thus no fluid pressure is applied to the OD servo regulator valve 44 during stick shift operation of the transmission in the 1, 2 or 3 gear position.

In fourth gear position, solenoid oil is applied to the 3–4 shift valve 24 through line 18, moving the valve 24 upwardly into its upshifted (4th gear) position. Movement of the valve 24 upwardly displaces the wider land on the modified valve and permits the application of OD D1 oil, which is supplied to the valve 24 through line 48, to flow through the valve and enter line 42. This oil is then supplied to the top end of the valve 44 to apply fluid pressure thereto for holding the valve 44 in a downward position. Accordingly, line pressure is now applied to valve 44 when the transmission is operating in fourth gear position. The volume and flow rate of OD D1 oil through line 42 when valve 24 is in its upshifted position is sufficient to overcome the small exhaust opening 40 in line 42, thereby assuring that line pressure will be applied to the top end of valve 44 and no substantial quantity of fluid will be exhausted through the opening 40 as the fluid flows through the line 42.

The stick shift (manual) operation of the AODE transmission occurs only without electronic controls. To allow for manual control of upshifts and downshifts while still maintaining adequate mainline pressure without computer controls, the command wires to the shift solenoids and the EPC solenoid (pressure regulator), designated by reference numeral 36 in FIG. 2, are disconnected and removed. The removal of the EPC solenoid results in all of the solenoids in the hydraulic system being maintained in an opened (exhaust) position, resulting in the absence of solenoid pressure applied to the shift end of the shift valve in the hydraulic circuitry, thereby causing mainline pressure to increase to its maximum value. The first gear position is maintained when the first gear selector is in its first position without regard to vehicle speed, as a result of the operation of the new 1–2 shift valve 2, previously discussed herein.

In stick shift (manual) operation without computer controls, the vacuum modulator designated by reference numeral 38 (FIG. 1) is coupled to EPC (electronic pressure control) line 34 to replace the EPC solenoid 36 (FIG. 2) which has been removed from the circuit. Also, the pressure relief valve 32, as illustrated in FIG. 1 and discussed above, is coupled to the EPC line 34 to reduce the relatively high line pressure of the factory installed AODE transmission.

When the AODE transmission is being operated with no computer controls in a stick shift (manual) mode of operation, no solenoid oil is applied to any of the shift valves, including the 2–3 shift valve designated by reference numeral 50. Accordingly, the valve 50 remains in a downshifted position when the gear selector lever is moved into the OD position. In accordance with a further aspect of the present invention, the hydraulic circuitry of the transmission is further modified to provide line pressure from the manual valve to the third clutch circuit, bypassing the 2–3 shift valve 50, when the gear selector lever is moved into the OD position during stick shift (manual) operation of the transmission. The manual valve 12 is further modified to exhaust the third clutch during a 3–2 manual downshift since the original third exhaust is plugged at the 2–3 shift valve 50 as a result of the modification of the circuitry described above to bypass the shift valve 50 during stick shift (manual) operation of the transmission in the OD position.

The AODE transmission has only three forward positions, namely, 1, 2 and D, and it is necessary to energize the solenoid switches 16 and 22 for a "3–4" shift. This is accomplished by applying an appropriate voltage (i.e., 12 volts) to the solenoid switches in the hydraulic circuitry by actuation of a toggle switch provided for this purpose. Both solenoid switches 16 and 22 are energized when the 3–4 shift valve is in its upshifted position during stick shift (manual) operation of the transmission.

In further aspects of the present invention, the hydraulic circuitry of the factory installed AODE transmission is modified to produce quick applies and releases with minimum gear ratio sharing (overlap). This goal is accomplished by enlarging and reducing the size of orifice openings in the factory installed transmission to increase or reduce fluid flow through selected lines, and by installing or replacing springs in the valves of the factory installed hydraulic circuitry to adjust the forces applied to the valves. Referring to the drawings, a restriction 52 in a portion of the line leading from the 2–3 accumulator 54 to the direct clutch restricts the flow of fluid from the 2–3 accumulator resulting in firmer shifts. Similarly, a restriction 56 in a portion of the line leading from the 1–2 accumulator 58 to the intermediate clutch restricts the flow of fluid from this accumulator to result in firmer shifts. The cross-sectional area of the feed lines, as for example at the positions designated by reference numerals 60 and 62, are increased to increase the quantity and flow rate of solenoid oil to the respective shift valves for providing firmer shifts resulting from quicker applies and releases with minimum gear ratio sharing or gear overlap. The minimum and maximum mainline pressure of the factory installed AODE is increased by approximately 12 psi by replacing the original springs of the shift valves of the factory installed transmission with springs having different characteristics to result in the increased overall line pressure. Increasing the minimum and maximum mainline pressure results in firmer and more correctly timed shifts, supplementing the aforementioned adjustments made to the fluid flow rates within the hydraulic circuitry to provide quicker applies and releases with minimum ratio sharing and gear overlapping. Accordingly, cooperation between adjustment of the spring forces applied to the shift valve of the factory installed transmission to increase minimum and maximum mainline pressure, and adjustment of the cross-sectional area of portions of different lines of the hydraulic circuitry for selectively increasing and decreasing the rate of fluid flow therethrough, produces firmer and more precisely timed shifts than are possible with the original hydraulic circuitry of the "factory installed" AODE transmission.

Other modifications within the scope of the present invention will become apparent to those skilled in the art. Accordingly, the above discussion of the preferred embodiments are intended to be illustrative only, and not restrictive of the scope of the invention, that scope being defined by the following claims and all equivalents thereto.

I claim:

1. A method for modifying hydraulic circuitry of a FORD AODE automotive transmission having at least first, second and overdrive (OD) gear selection positions; said AODE transmission having a manual valve coupled to and movable with a gear selector; said AODE transmission having a 1–2 shift valve coupled in fluid flow relationship to said manual valve; the steps of said method including:

providing a fluid flow path through said 1–2 shift valve for supplying fluid from said fluid flow path to a first solenoid valve coupled in fluid flow relationship to one end of said 1–2 shift valve when said gear selector is in a first gear position, said fluid supplied to said first solenoid valve from said fluid flow path in said 1–2 shift valve supplementing other fluid supplied to said first solenoid valve, and causing a volume of fluid to flow through said fluid flow path in said 1–2 shift valve such that total fluid supplied to said first solenoid valve exceeds the capacity of said first solenoid valve to exhaust said total fluid supplied thereto such that fluid pressure is applied to said one end of said 1–2 shift valve to maintain said 1–2 shift valve in a downshifted position without regard to vehicle speed when said gear selector is in said first gear position.

2. The method as claimed in claim 1 further including the step of causing said fluid to flow through said fluid flow path in said 1–2 shift valve by moving said gear selector into said first gear position for simultaneously moving to said manual valve into a corresponding first gear position.

3. The method as claimed in claim 2 further including the step of exhausting fluid through said manual valve to prevent fluid from flowing through said fluid flow path in said 1–2 shift valve when said gear selector is placed in a second gear position.

4. The method as claimed in claim 1 further including the step of applying a fluid pressure to said one end of said 1–2 shift valve sufficient to overcome an opposing resilient force exerted on said 1–2 shift valve urging said 1–2 shift valve into an upshifted position.

5. A method of modifying hydraulic circuitry of a FORD AODE automotive transmission having at least first, second and overdrive (OD) gear selector positions; said AODE transmission having a manual valve coupled to and movable with a gear selector; the steps of said method including:

providing an opening in said manual valve for exhausting fluid through said opening to decrease the rate of apply of an OD band of said AODE transmission during an upshift from the first to the second gear selector positions.

6. The method as claimed in claim 5 further including the step of modifying said manual valve of said FORD AODE automotive transmission by providing an additional land on said manual valve, said opening in said manual valve being provided in said additional land.

7. A method for modifying hydraulic circuitry of an automotive transmission including at least first, second and overdrive (OD) gear selector positions; said automotive transmission further including an EPC (Electronic Pressure Control) hydraulic line coupled in fluid flow relationship to an EPC (Electronic Pressure Control) solenoid, the steps of said method comprising:

coupling a pressure relief valve in fluid flow relationship to said EPC hydraulic line.

8. The method as claimed in claim 7 wherein said pressure relief valve coupled to said EPC hydraulic line prevents fluid pressure in said EPC hydraulic from exceeding substantially 90 pounds per square inch (psi).

9. The method as claimed in claim 7 further including the step of removing EPC solenoid and replacing it with a vacuum modulator coupled in fluid flow relationship to said EPC hydraulic line.

10. A method of modifying hydraulic circuitry of an automotive transmission having a gear selector movable between at least first, second and third gear selection positions, a "3–4" shift valve, an OD servo regulator valve, and a line connecting said 3–4 shift valve and said OD servo regulator valve in fluid flow relationship, the steps of said method including:

modifying said 3–4 shift valve to prevent fluid flow from said 3–4 shift valve to said OD servo regulator when said gear selector is in said first, second or third gear selection position.

11. The method as claimed in claim 10 further including the step of providing an opening in said line connecting said 3–4 shift valve to said OD servo regulator for exhausting any fluid in said line when said gear selector is in said first, second or third gear selection position.

12. The method as claimed in claim 10 further including the step of causing fluid to flow through said line from said 3–4 shift valve to said OD servo regulator valve when said 3–4 shift valve is upshifted into a fourth gear position.

13. The method as claimed in claim 12 further including the steps of:

providing an opening in said line connecting said 3–4 shift valve to said OD servo regulator to exhaust any fluid in said line when said gear selector is in said first, second or third gear selection position; and causing a volume of fluid to flow through said 3–4 shift valve, past said opening in said line, to said OD servo regulator valve when said 3–4 shift valve is upshifted into fourth gear position to maintain said 3–4 shift valve in said upshifted position.

14. The method as claimed in claim 12 further including the step of providing flow of fluid to said OD servo regulator for applying fluid pressure to one end of said OD servo regulator to overcome an opposed predetermined resilient force exerted on an opposed end of said OD servo regulator.

15. A method for modifying hydraulic circuitry of an automotive transmission having at least first, second and overdrive (OD) gear selector positions; a manual valve coupled to and movable with a gear selector; and a 2–3 shift valve coupled in fluid flow relationship to said manual valve; the steps of said method including:

preventing flow of fluid into said 2–3 shift valve so as to maintain said 2–3 shift valve in a downshifted position, and modifying the manual valve to cause fluid flow to bypass said 2–3 shift valve in said downshifted position.

16. The method as claimed in claim 15 further including the step of modifying said manual valve to bypass said 2–3 shift valve by causing fluid to flow into a third clutch circuit.

17. The method as claimed in claim 16 further including the step of:

exhausting fluid through from said third clutch circuit through said manual valve during a 3–2 downshift of said transmission.

18. A method for modifying hydraulic circuitry of an automotive transmission having at least first, second and overdrive (OD) gear selector positions; said automotive transmission having a 2–3 accumulator, a direct clutch, and a line coupling said 2–3 accumulator to said direct clutch in fluid flow relationship, the steps of said method including:

decreasing the cross-sectional area of at least a portion of said line connecting said 2–3 accumulator to said direct clutch to decrease the rate of fluid flow from said 2–3 accumulator.

19. A method for modifying hydraulic circuitry of an automotive transmission having at least first, second and overdrive (OD) gear selector positions; said automotive transmission including a 1–2 accumulator, an intermediate clutch, and a line coupling said 1–2 accumulator to said intermediate clutch in fluid flow relationship, the steps of said method including:

decreasing the cross-sectional area of at least a portion of said line connecting said 1–2 accumulator to said intermediate clutch for decreasing the fluid flow rate from said 1–2 accumulator.

20. A method for modifying hydraulic circuitry of a FORD AODE automotive transmission including at least one shift valve biased in a downshifted position by a resilient force applied to one end of said shift valve, a line supplying fluid to said shift valve for applying a fluid pressure to a second end of said shift valve opposed to said one end of said shift valve, said fluid pressure being applied to oppose and overcome said resilient force applied, the steps of said method including:

increasing the cross-sectional area of at least a portion of said line supplying fluid to said second end of said shift valve to increase the fluid flow rate to said second end of said shift valve.

* * * * *